(No Model.)

F. W. SEABURY.
PROCESS OF SECURING TEETH TO ARTIFICIAL GUMS AND FLASK FOR THE SAME.

No. 271,370.                        Patented Jan. 30, 1883.

WITNESSES:
Wm L Cook,
H. J. Miller

INVENTOR:
Frederick W. Seabury
by Joseph A. Miller & Co
Att'ys

UNITED STATES PATENT OFFICE.

FREDERICK W. SEABURY, OF PROVIDENCE, RHODE ISLAND.

PROCESS OF SECURING TEETH TO ARTIFICIAL GUMS, AND FLASK FOR THE SAME.

SPECIFICATION forming part of Letters Patent No. 271,370, dated January 30, 1883.

Application filed April 10, 1882. (No model.)

*To all whom it may concern:*

Be it known that I, FREDERICK W. SEABURY, of the city and county of Providence, and State of Rhode Island, have invented a new and useful Improvement in the Process of Securing Teeth to Artificial Gums, and Flasks for the Same; and I hereby declare that the following is a full, clear, and exact description of the same, reference being had to the accompanying drawings, forming part of this specification.

This invention has reference to an improvement in what are known as "dental flasks," and which are used for the purpose of uniting the artificial teeth to the artificial gums under pressure.

The invention consists in providing such flasks with guides inclined at such an angle that when the upper flask is forced down to embed the teeth into the gums the upper part will be moving at a sufficient angle to properly enter the teeth and close the gums, as will be more fully set forth hereinafter.

Figure 1:
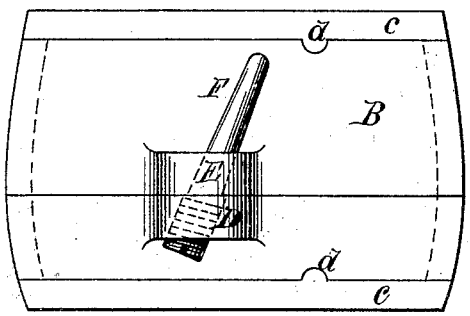
Figure 2:
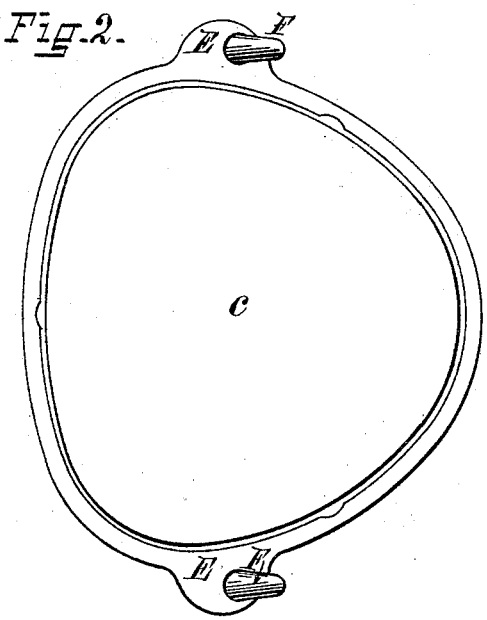

Figure 1 is a side view of a dental flask provided with guides inclined at an angle. Fig. 2 is a top view of the same.

In the drawings, A is the lower part of the flask, in which the gums are supported on a proper mold to receive the teeth.

B is the upper part of the flask, in which the teeth are secured in plaster molds.

The gums are made of celluloid or similar material, and the teeth are secured by forcing their roots into the previously-prepared gums. This is done in a specially-constructed press, heated so that the teeth will enter the semi-plastic material, and if the pressure were exerted in a vertical direction, the front of the gums would have to be sloping slightly outward, whereas a natural set of gums must be rounded outward, and have to be undercut. The base of the teeth is also larger than their upper ends, and if the teeth are pressed down vertically into the gum the gum will not close around the teeth. By forcing the teeth into the gums at an angle they will displace some of the material of the gum laterally toward the rear, which, when the plaster mold comes fairly down on the gum, is pressed closely around the teeth, and by the inward and downward motion exerted by virtue of the guides the front of the gum is properly formed and the material closed around the teeth.

C C are the top and bottom covers of the flask. They are held in the proper place by the projections $d\ d$, which enter corresponding cavities in the flask.

D D are ears or lugs formed on the lower flask, A, and E E are eyes formed on the upper or cove portion, B, of the flask. The pins F F are secured preferably by screw-threads in the lugs D, and pass through holes in the eyes E E.

When the gum is properly set in the flask A and the teeth are secured in the cove B, the cove is placed on the lower flask, A, guided by the inclined pins F, until the teeth rest on the gum. The flask is now inserted into the heated press, and pressure is gradually applied until the teeth have entered the gum and the two parts of the flask have come together, at which point the mold, containing the teeth and held in the part B of the flask, will also have forced the gum into the shape and form required. After cooling, the gum and teeth are removed from the flask.

By this improved process a stronger, better finished, and more durable set of teeth is produced than was possible by the process heretofore used.

Having thus described my invention, I claim as new and desire to secure by Letters Patent—

In combination with a two-part dental flask, an inclined guide secured to one part of the flask, and operating to move the other part obliquely to its final position when closing, substantially as and for the purpose set forth.

FREDERICK W. SEABURY.

Witnesses:
J. A. MILLER, Jr.,
WM. L. COOP.